Patented June 13, 1939

2,161,938

UNITED STATES PATENT OFFICE 2,161,938

IMIDAZOLINES

Adolf Sonn, Konigsberg, Germany, assignor to the firm Society of Chemical Industry in Basle, Basel, Switzerland No Drawing. Application February 25, 1938, Serial No. 192,645. In Germany July 31, 1934

4 Claims. (Cl. 260—309)

The present application is a continuation-in-part of my copending application Serial No. 33,911, filed July 30, 1935.

It has been found that imidazolines of the general formula

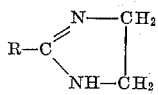

wherein R stands for a member of the group consisting of substituted and unsubstituted phenylmethyl, naphthylmethyl, and quinolinemethyl radicals, the substituent being a member of the group consisting of hydroxy, alkoxy and alkyl, can be obtained by causing iminoethers of the general formula

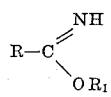

wherein R has the signification indicated above and $R_1$ stands for an alkyl radical, to react with ethylene diamine.

The iminoethers may be caused to react with ethylene diamine in the form of free bases or as salts of mineral acids, in the presence or absence of a solvent such as alkanols or alkyl polyhalides at room temperature or at a raised temperature. When the reaction is carried out at low temperature and particularly when using free iminoethers, a neutral gas is preferably passed through the composition for the purpose of removing the ammonia formed in the course of the reaction. When using a free iminoether and in the absence of a solvent, the crude imidazoline is obtained directly after the reaction is at an end, which can be recognized by the discontinuation of the evolution of ammonia. The crude imidazoline can be purified by distillation or crystallization. When using however a salt of an iminoether as well as a solvent, the solvent is distilled when the evolution of ammonia is finished, the residue is recrystallized or mixed with a strong lye and extracted with an organic solvent insoluble in water. After drying the solution of the extraction with one of the usual alkaline drying agents, the solvent is expelled and the residual imidazoline base is either distilled or recrystallized.

The iminoethers used as parent materials are produced from the corresponding nitriles by dissolving the latter in alkanols or in other organic solvents to which an alkanol has been added, mixing them at low temperature with a mineral acid and allowing them to stand for several hours. The solvent is then expelled under reduced pressure at as low a temperature as possible and there remains the salt of the iminoether.

It is known to produce 2-alkyl-imidazolines by heating the salts of aliphatic 1:2-diamines with salts of fatty acids [Ladenburg, "Berichte der deutschen chemischen Gesellschaft", vol. 27, pages 2952–57 (1894), Klingenstein, loc. cit. vol. 28, pages 1173–76 (1895)]. 2-phenyl- or 2-naphthyl-imidazoline can for example be obtained by causing thiobenzamide to react with ethylene diamine [G. Forssel, loc. cit. vol. 25, pages 2132–42 (1892)] or by the action of benzimino-ethylether on bromethylamine hydrobromide in the presence of sodium alcoholate [Stollé et al., "Journal für praktische Chemie", vol. 140, page 60 (1934)]. Compounds of the kind indicated above are also obtained by the action of iminoethers of higher fatty acids on diamines [Bockmühl et al., U. S. Patent 1,958,529 (1934)]. Further it is known to obtain $\mu$-glyoxalidine-arylmethylols by the action of alkylene diamines on iminoethers of substituted mandelic acids [Bockmühl et al., U. S. Patent 1,999,989 (1935)].

The new compounds, the salts of which are all easily soluble in water, have essential pharmacological advantages over the known compounds indicated above. Thus, for example, the blood pressure of the rabbit is increased to a much greater extent.

The following examples illustrate the invention, the parts being by weight:

Example 1

The phenyl-acetiminoether hydrochloride of the formula

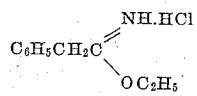

from 12 parts of benzylcyanide is mixed with 8 parts of ethylene-diamine hydrate which has been diluted with little alcohol, whereby the crystals go into solution. The whole is then heated on the water-bath until the ammonia odor has disappeared, cooled, concentrated caustic potash solution added, and the separated oil extracted with ether. The solution is dried with potassium carbonate and potassium hydroxide. After evaporation a pale oil is left which distills at 147° C. under a pressure of 9 mm. and which solidifies in the condenser to a white crystalline mass. The yield amounts to 90 per cent. of the theory. The hydrochloride melts at 168–170° C. This product has the formula

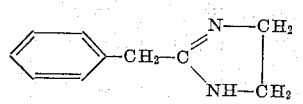

Instead of alcohol, chloroform may also be used as solvent. One may, however, just as well renounce to the solvent.

Instead of the hydrochloride, the sulfate of the iminoether may also be used.

In similar manner like the benzylimidazoline described above, there may also be produced alkylbenzylimidazolines, such as for example dimethylbenzylimidazoline, ethylbenzylimidazoline, propylbenzylimidazoline.

Example 2

3 parts of 3:4:5-trimethoxyphenyl-acetimino-ethyletherhydrochloride of the formula

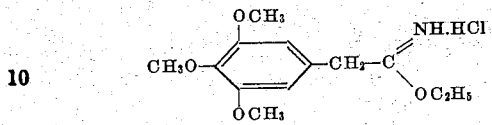

(of melting point 114–115° C. with decomposition, produced from 3:4:5-trimethoxy-phenylacetonitrile) are dissolved in 15 parts of absolute alcohol. 1 part of the ethylene diamine is added fairly quickly, and the mixture is slowly heated to 80° C. and maintained at this temperature for some hours. The alcohol is then expelled and the residue is mixed with dilute caustic soda solution and thoroughly extracted with benzene. After drying over potash the residue is distilled under a pressure of 0.15 mm. The 2-(3':4':5'-trimethoxybenzyl)-imidazoline of the formula

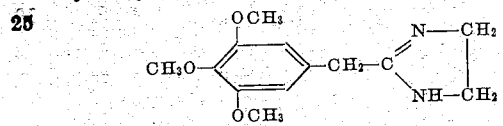

is a colorless crystalline mass of boiling point 170–171° C. under 0.15 mm. pressure and of melting point 76–77° C. The hydrochloride is a colorless crystalline powder of melting point 185–186° C.

Instead of the hydrochloride of the 3:4:5-trimethoxy-phenyl-acetimino-ethylether there may be used just as well also another hydrohalide.

In similar manner there may also be produced other alkoxy-benzylimidazolines, such as ethoxy-, propyloxy-, butyloxy-benzyl-imidazolines.

Example 3

2.7 parts of 4-methoxy-naphthyl-(1)-acetiminoethylether hydrochloride of the formula

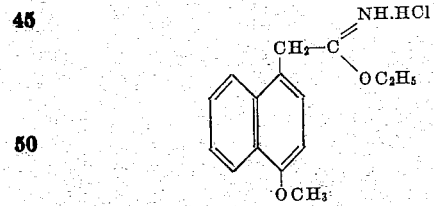

(produced from 4-methoxy-naphthyl-(1)-acetonitrile) are dissolved in 12 parts of absolute alcohol. 1 part of ethylenediamine is then added and the whole is heated to gentle boiling while passing it through nitrogen and simultaneously stirring until ammonia escapes no longer. The alcohol is then distilled and the residue mixed with 40 parts of benzene and 1.8 parts of caustic potash. Stirring is continued for some time whereby the imidazoline base is dissolved in benzene. The benzene residue is recrystallized several times from toluene. The 2-[4-methoxy-naphthyl-(1')-methyl]-imidazoline of the formula

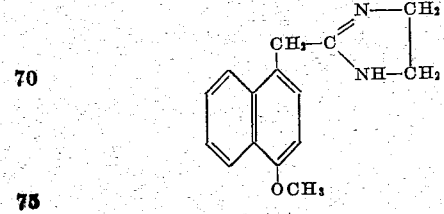

represents colorless crystals of melting point 123–124° C. Its hydrochloride is easily soluble in water.

According to this process there may also be produced hydroxy-, alkyl-, and other alkoxy-naphthylmethylimidazolines.

In analogous manner there may for example also be produced the following compounds:—

2-[4'-oxybenzyl]-imidazoline, melting point of the hydrochloride 186–187° C.;
2-[3':4':5'-trioxy-benzyl]-imidazoline, melting point of the hydrochloride 203–205° C.;
2-[4'-methoxy-benzyl]-imidazoline of melting point 118–120° C.;
2-[3':4'-dimethoxy-benzyl]-imidazoline, melting point of the hydrochloride 210–211° C.;
2-[3':4'-methylenedioxy-benzyl]-imidazoline, melting point of the hydrochloride 202–203° C.;
2-[2':3':4'-trimethoxy-benzyl]-imidazoline of melting point 86–87° C.;
2-[4'-methylbenzyl]-imidazoline, melting point of the hydrochloride 206–207° C.;
2-[naphthyl-(1')-methyl]-imidazoline, melting point of the hydrochloride 252–253° C.;
2-[2'-methoxy-naphthyl-(1')-methyl]-imidazoline of melting point 147–148° C.;
2-[quinoline-(8')-methyl]-imidazoline of melting point 93–95° C.;
2-[alkoxy quinoline-(8')-methyl]-imidazolines, and corresponding hydroxy- and alkyl-quinolinemethylimidazolines.

What I claim is:

1. The compounds of the formula

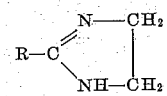

wherein R stands for a member of the group consisting of substituted and unsubstituted phenylmethyl, naphthylmethyl and quinoline-C-methyl radicals, the substituent being a member of the group consisting of hydroxy, alkoxy and alkyl, the methyl group of said substituted and unsubstituted phenylmethyl, naphthyl methyl and quinoline-C-methyl radicals being unsubstituted.

2. The compound of the formula

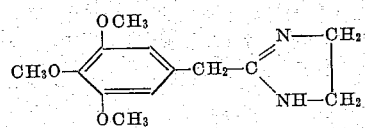

forming a hydrochloride of melting point 185–186° C.

3. The compounds of the formula

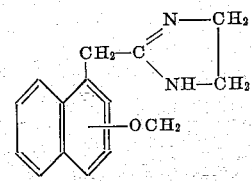

4. The compound of the formula

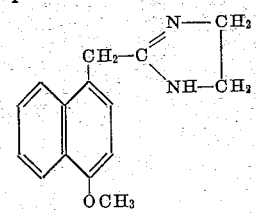

forming crystals of melting point 123–124° C.

ADOLF SONN.